Sept. 23, 1952    P. THOMAS    2,611,626
TANDEM AXLE SPRING MOUNTING
Filed Feb. 5, 1948    2 SHEETS—SHEET 1
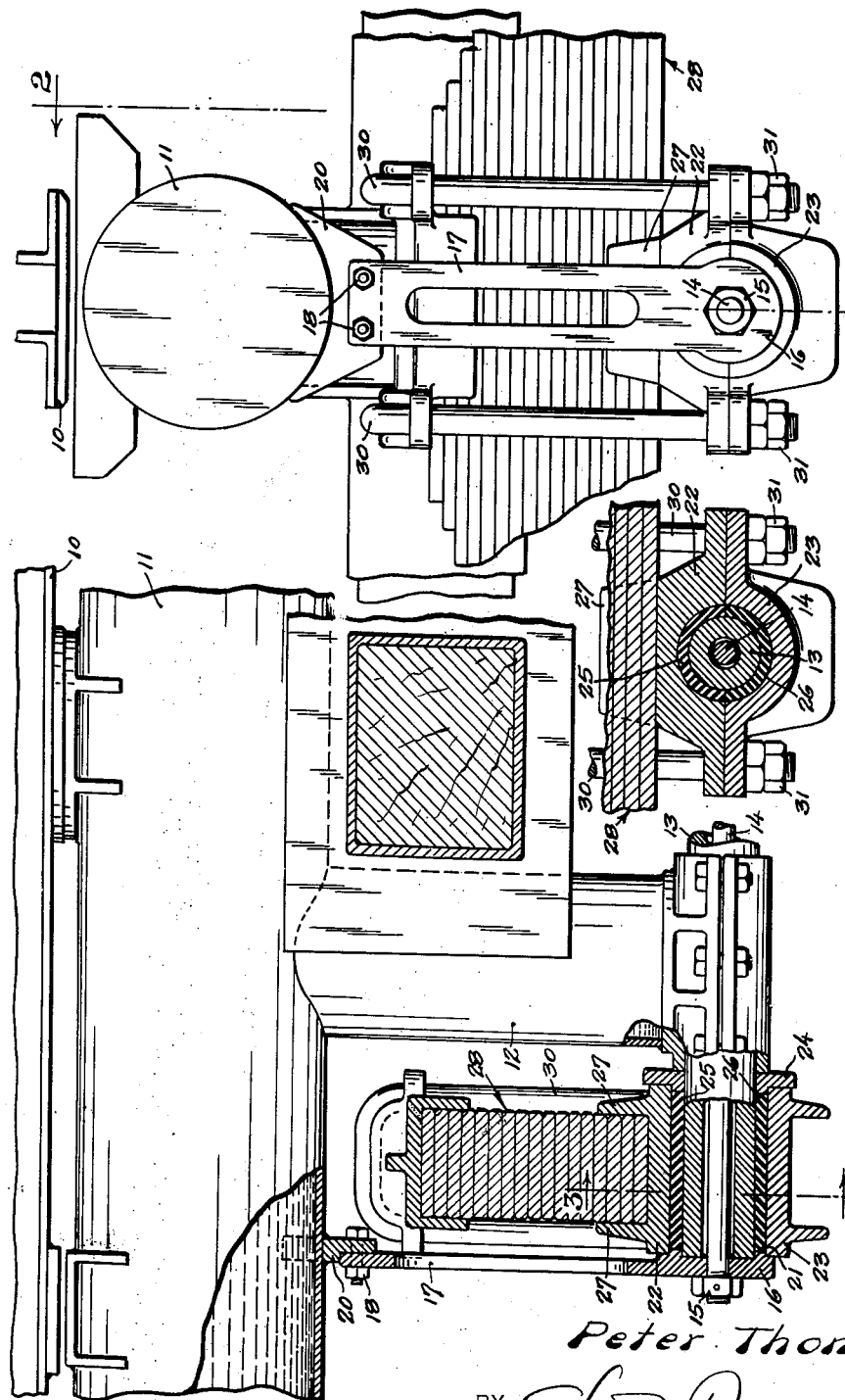
INVENTOR.
Peter Thomas
BY Edward E. Barnet
ATTORNEY.

Sept. 23, 1952 P. THOMAS 2,611,626
TANDEM AXLE SPRING MOUNTING
Filed Feb. 5, 1948 2 SHEETS—SHEET 2

INVENTOR.
Peter Thomas
BY
att'y

Patented Sept. 23, 1952

2,611,626

UNITED STATES PATENT OFFICE 2,611,626

TANDEM AXLE SPRING MOUNTING

Peter Thomas, Seattle, Wash.

Application February 5, 1948, Serial No. 6,479

11 Claims. (Cl. 280—104.5)

This invention relates to a trunnion mounting, and one, more especially, arranged and adapted to be applied to a multiple-leaf spring assembly of the type commonly employed as a connection between the two axles of a tandem rear-axle truck or trailer. The trunnion mounting of the present invention is of that nature employing a bushing or sleeve of rubber interposed under compression between a trunnion shaft and the surrounding wall of a trunnion block to which the spring assembly is centrally shackled, with the rubber serving by its elasticity to yieldingly resist wrist movements of the block about the center of the trunnion shaft as an axis and hence serving the function of a torsion spring. In previously developed mountings of this nature, the objection has been principally one of installation. Due to the bushing having a tight fit within the space which it is to occupy, considerable difficulty is experienced by the resulting "grab" which takes place as the bushing is subjected to endwise pressure in the operation of forcing the same into position upon the shaft, and the principal aim of the present invention is to provide an arrangement overcoming this objection. A further object is to better confine the rubber sleeve and effectively protect the same against access of dirt while at the same time firmly positioning the trunnion shaft and the associated shackling block in a manner assuring that the same will maintain a co-axial relationship. It is a further object still to give to the trunnion shaft a rigid mounting both at the inner and outer side of the trunnion block to the end of holding the shaft ends secure against liability of distortion both from the dead weight of the spring load and twist forces passed from the tandem rear axles into the spring assembly.

Other and yet more particular objects and advantages inherent in the design will, with the foregoing, appear and be understood in the following detailed description and in the claims thereto annexed, the invention consisting in the novel construction and in the adaptation and combination of parts hereinafter described and claimed.

In the accompanying drawing:

Figure 1 is a fragmentary end elevational view portraying a trunnion mounting constructed in accordance with the preferred teachings of the present invention, the view being side elevational as it pertains to the vehicle.

Fig. 2 is a fragmentary longitudinal vertical sectional view thereof with parts in elevation and with the section taken on line 2—2 of Fig. 1.

Fig. 3 is a fragmentary transverse vertical sectional view on line 3—3 of Fig. 2.

Figure 4:
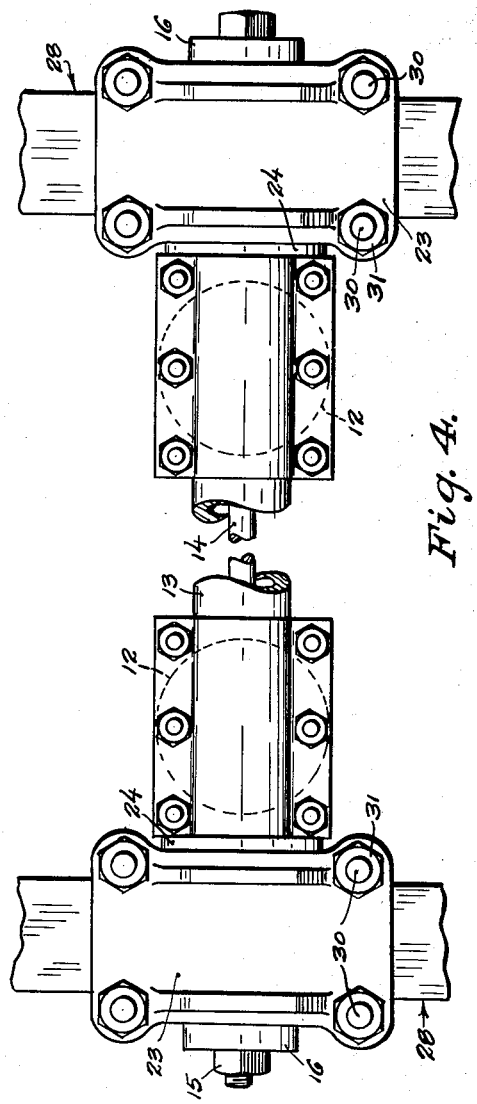
Fig. 4 is a fragmentary underside plan view to illustrate the co-axial relationship as between the trunnion mounting at one side and the trunnion mounting at the other side of the vehicle.

The vehicle with which I have elected to illustrate my trunnion mounting is a logging trailer having its bunk 10 swivel-mounted upon a water tank 11 by means of the usual king-pin (not shown), the water tank constituting the transverse principal of the trailer frame and having welded thereto a pair of post dependencies 12 placed one upon one side and the other upon the other side of the vehicle's longitudinal center line. Being hollow, the posts serve as reservoirs for hydraulic braking fluid and find connection with the vehicle's braking system by suitable fluid-flow pipes which are deleted from the drawing. The two posts each foot upon and are clamped or otherwise rigidly secured to a hollow and transversely extending trunnion-shaft 13, and this shaft, which is a through-shaft, projects by its opposite ends outwardly beyond the posts. Received through the shaft is a bolt 14 headed upon one end and having its other end threaded for reception of a nut 15, and engaged by this head and by the nut to bear against and sustain the ends of the shaft are stirrups designated 16. Said stirrups are formed integral with depending struts 17 the head ends of which are removably secured, as by bolts 18, to hanger members 20 welded as integral adjuncts of the tank, and each said stirrup is formed in the nature of a face plate presenting upon the inner surface a projecting annular lip 21. The lip lies concentric to a center-bore through which the bolt passes and defines the outer margin of a recess dimensioned to produce a snug fit for the end extremity of the shaft.

Denoted 22 and 23 are a saddle principal and a saddle cap constituting the components of a split trunnion block of which the former is arranged to occupy a position above and the latter a position below the horizontal center of the trunnion shaft. Being produced to a diameter somewhat larger than the diameter of the shaft, the bearing chamber of this split block fits by its outer end over the perimeter of the lip 21 and by its inner end over the perimeter of a corresponding annular lip presented by a collar 24 which has a slide fit upon the shaft. The degree to which the oppositely placed lips project inwardly beyond the end faces of the block is comparatively slight, leaving therebetween an annular chamber adapted to receive the elastic rubber bushing of the present invention. Distinguished from the usual practice of employing a one-piece rubber sleeve, the present bushing is composed of two matching semi-circular segments designated 25 and 26.

Reverting to the block, the upper or principal component thereof is formed to present upon its upper face a flat seat walled along the side margins by upstanding cheeks 27, and this seat serves as a center mounting for multiple superimposed leaves of a spring assembly 28. For binding the spring leaves to the block there is employed the usual U-shaped shackle bolts 30 and associated nuts 31 with the latter finding a purchase against the block's cap member 23 to take up on the latter coincident with the performance of their spring-binding office.

In applying the rubber segments 25 and 26, and which is performed with the strut removed, the procedure is to loosely assemble the two components of the trunnion block and place the same in position with the spring assembly seated thereon, following which the two rubber segments are slipped into the exposed chamber. The strut is now applied, its head end being bolted to the hanger 20 while its stirrup-forming plate 16 is secured in position against the end face of the trunnion-shaft, and the installation is then completed by taking up on the shackle bolts to bind the spring leaves and draw the components of the trunnion block together, the latter step compressing the two-piece rubber bushing into its working compass. When so installed, the rubber of the bushing takes a friction grip by its inner surface from the non-rotary trunnion shaft and operates by its outer surface to frictionally grip the bearing block, consequently serving the office of a torsion spring in that it yieldingly restrains the block against wrist movement about the center of the trunnion shaft as an axis.

While having expressly described my trunnion mounting in the form which I now consider best exemplifies the invention, it is self-evident that minor changes in the details of construction cen be resorted to without departing from the spirit of the invention and I accordingly intend that the hereto annexed claims be given the broadest interpretation which the employed language fairly admits.

What I claim is:

1. In a tandem rear-axled vehicle, and in combination with the vehicle frame and with a spring assembly extending longitudinally between the two tandem rear axles, a trunnion mounting for the spring comprising a split bearing-block shackled to the spring, a trunnion-shaft of less diameter than that of the bearing-block's bearing chamber received in said chamber and rigidly connected with the frame, complementary separate segments of elastic material applied as a bushing within said bearing chamber and held by the inner surface to the shaft and by the outer surface to the block to serve the office of a torsion spring resiliently restraining wrist movement of the bearing-block, and means maintaining a co-axial relationship between the shaft and the bearing chamber.

2. In a tandem rear-axled vehicle, and in combination with the vehicle frame and with a spring assembly applied at each side thereof as a longitudinal connection between the two tandem rear axles, co-axial trunnion mountings for the two spring assemblies comprising, for each, a split bearing-block shackled to the spring, a transverse trunnion-shaft of less diameter than that of the bearing-block's bearing chamber received in said chamber and rigidly connected with the frame, complementary separate segments of elastic material applied as a bushing within said bearing chamber and frictionally held by the inner surface to the shaft and by the outer surface to the block to serve the office of a torsion spring resiliently restraining wrist movement of the bearing-block, and a frame-carried strut applied exteriorly of the spring and providing a stirrup element engaging both the shaft and the bearing-block and by said engagement functioning to hold the block against axial displacement relative to the shaft.

3. The structure of claim 2 in which the stirrup element comprises a plate arranged to overlie the outer face of the bearing-block and presenting an annular lip encircling the shaft and fitting the end of the bearing chamber.

4. The structure of claim 3 in which the trunnion-shaft is hollow and extends as a through-shaft from the bearing block at one side to the bearing block at the other side of the vehicle, and a bolt received through said trunnion shaft and clamping said stirrup elements thereto.

5. In a tandem rear-axled vehicle, and in combination with the vehicle frame and with a spring assembly applied at each side thereof as a longitudinal connection between the two tandem rear axles, co-axial trunnion mountings for the two spring assemblies comprising, for each, a split bearing-block shackled to the spring, a hollow transverse trunnion-shaft of less diameter than that of the bearing-block's bearing chamber rigidly secured to the frame extending as a through-shaft with one end received in the bearing-block at one side and the other end received in the bearing-block at the other side of the vehicle, a bushing of elastic material received in the space between the wall of said bearing chamber and the housed end of the shaft, a frame-carried strut applied exteriorly of the spring to overlie the block and presenting an annular lip fitting the bearing chamber in encircling relation to the shaft to operate as a stirrup holding the block against axial displacement relative to the shaft, and a bolt received through said trunnion shaft and clamping said stirrup elements thereto.

6. The structure of claim 5 having a collar carried by the shaft and presenting the counterpart of said lip fitting the bearing chamber at the inner side of the block.

7. In a tandem rear-axled vehicle, and in combination with the vehicle frame and with a spring assembly applied at each side thereof as a longitudinal connection between the two tandem rear axles, co-axial trunnion mountings for the two spring assemblies comprising, for each, a split bearing-block shackled to the spring, a transverse trunnion-shaft of less diameter than that of the bearing-block's bearing chamber received in said chamber and rigidly connected with the frame, separate segments of rubber producing the components of a bushing and held under compression between the wall of said chamber and the inserted end of the shaft and by its frictional grip serving the office of a torsion spring for resiliently restraining wrist movement of the bearing-block, said vehicle frame having an out-jutting part overhanging the spring, and a strut applied at the outer side of the spring with its upper end removably secured to said out-jutting part and with its lower end presenting a face plate removably secured to the end extremity of the shaft to sustain the latter and also sustaining the block against axial displacement relative to the shaft, the sustaining instrumentality comprising an annular lip provided by the face plate and performing the office of a stirrup by fitting within the outer end of the bearing chamber in encircling relation to the shaft.

8. The structure of claim 7 having the counterpart of said lip fitting the bearing chamber at the inner side of the block.

9. The structure of claim 7 in which the trunnion-shaft is hollow and extends as a through-shaft from the bearing-block at one side to the bearing block at the other side of the vehicle, the means for securing the face plates to the shaft comprising a bolt passing through the shaft and serving to clamp the plates against the end faces of the shaft.

10. A tandem-axle logging trailer construction comprising, in combination with the tandem axles: multiple-leaf spring assemblies at each side of the trailer extending longitudinally between and connected by their ends to the axles, respective split bearing blocks shackled to the springs, a transverse trunnion-shaft of less diameter than the bearing chamber of the bearing-block and extending as a through-shaft with one end received in the bearing block at one side and the other end received in the bearing block at the other side of the trailer, separate complementing segments of rubber received in said bearing blocks and producing the components of a bushing held under compression between the wall of the respective bearing chamber and the inserted end of the trunnion-shaft, hollow posts serving as reservoirs for hydraulic brake fluid and applied one at one side and the other at the other side of the trailer's longitudinal center line and each footing upon and made rigid with the shaft, a tank serving as a transverse frame principal, said tank being welded to the head ends of the posts to lie above the springs and projecting by its ends outwardly beyond the latter, a bunk swivel-mounted upon the tank, hangers welded upon the underside of said projecting tank ends, and struts applied outside the springs with the upper ends removably secured to the related hanger and with the lower ends presenting a face plate removably secured to the related end extremity of the trunnion-shaft, said struts sustaining the ends of the trunnion-shaft and also sustaining the related block against axial displacement relative to the shaft with the sustaining instrumentality comprising an annular lip provided by the face plate and performing the office of a stirrup by fitting within the outer end of the bearing chamber in encircling relation to the shaft.

11. In a tandem rear-axled vehicle, and in combination with the vehicle frame and with a spring assembly extending longitudinally between the two tandem rear axles, a trunnion mounting for the spring comprising a split bearing-block shackled to the spring, a trunnion-shaft of less diameter than that of the bearing-block's bearing chamber received in said chamber and rigidly connected with the frame, a bushing of elastic material received under compression between the shaft and the wall of said chamber and acting by its inner surface to frictionally grip the shaft and by its outer surface to frictionally grip the block, thus serving the office of a torsion spring resiliently restraining wrist movement of the bearing-block, and means maintaining a co-axial relationship between the shaft and the bearing chamber.

PETER THOMAS.

REFERENCES CITED

The following references are of record in the file of this patent:

UNITED STATES PATENTS

| Number | Name | Date |
|---|---|---|
| 1,624,239 | Harris | Apr. 12, 1927 |
| 1,729,381 | Golden | Sept. 24, 1929 |
| 1,763,767 | Fageol | June 17, 1930 |
| 1,930,208 | Marcum | Oct. 10, 1933 |
| 1,940,914 | Marcum | Dec. 26, 1933 |
| 2,096,530 | Alden | Oct. 19, 1937 |
| 2,390,168 | Piot | Dec. 4, 1945 |

FOREIGN PATENTS

| Number | Country | Date |
|---|---|---|
| 364,310 | Great Britain | Jan. 7, 1932 |
| 434,462 | Great Britain | Sept. 2, 1935 |